3,448,725
MILKING STALL
William Z. Holm, Petaluma, Douglas Clegg, Calistoga, and Oliver C. Illia, Petaluma, Calif., assignors to Holm Tractor and Equipment Company, Petaluma, Calif., a corporation of California
Continuation-in-part of application Ser. No. 555,507, June 6, 1966. This application Apr. 29, 1968, Ser. No. 732,483
Int. Cl. A01j 1/00
U.S. Cl. 119—27     11 Claims

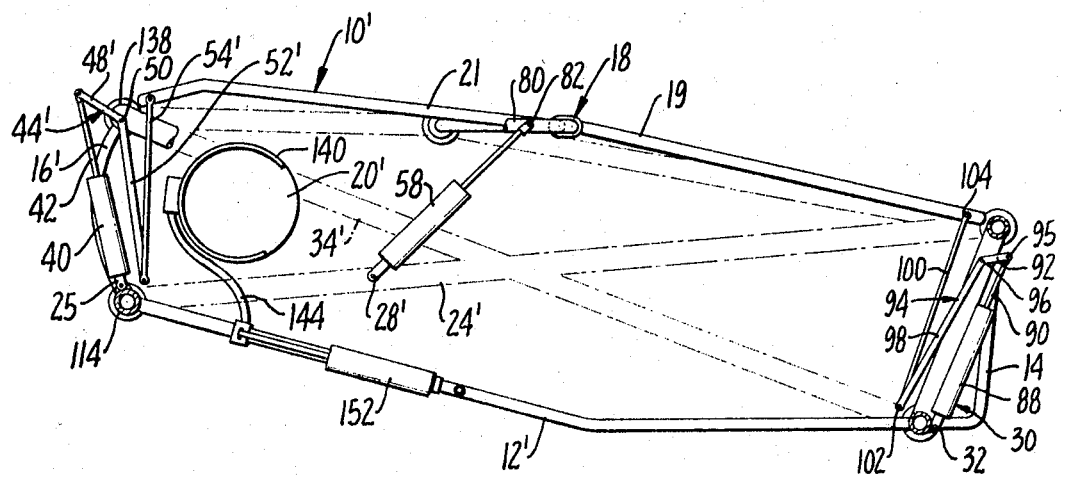
FIG. 7.
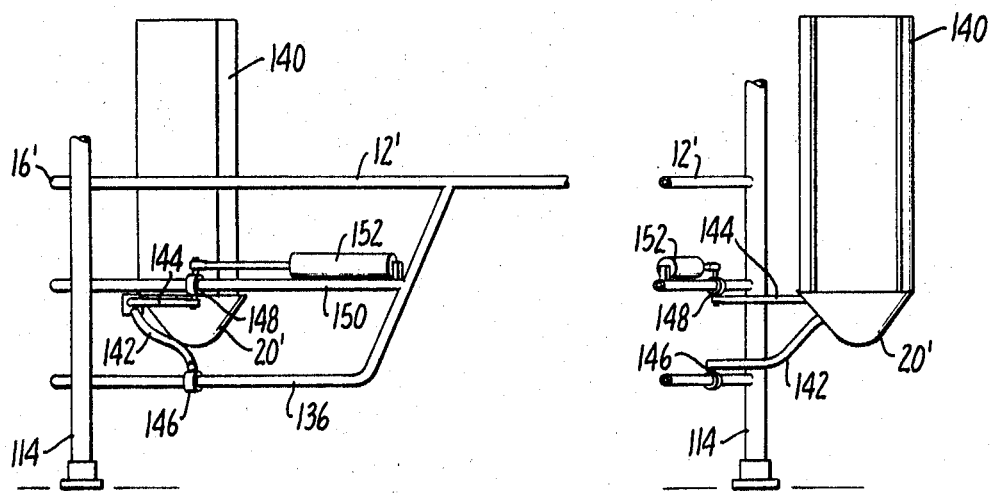
FIG. 8.
FIG. 9.
INVENTORS
WILLIAM Z. HOLM
DOUGLAS CLEGG
OLIVER C. ILLIA
Naylor & Neal
ATTORNEYS //  # United States Patent Office 3,448,725
Patented June 10, 1969

ABSTRACT OF THE DISCLOSURE

An adjustable milking stall for dairy cows where the stall has a stationary rear wall adjacent to a milking station, and adjustable means either in the form of an adjustable front wall or an adjustable manger movable toward the rear wall to shorten the stall for cows of different length. Additionally, the width of the stall may be adjusted for cows of different width.

---

This is a continuation-in-part of application Ser. No. 555,507, filed June 6, 1966, and now abandoned.

This invention relates to stalls for milking and feeding cattle. The stalls are particularly suitable for the modern method of machine milking.

The general environment in which this type of stall is used is disclosed in the Ferris Patents Nos. 2,904,001 and 2,904,002. As explained in these patents, the primary function of this type of stall is to position the cow so that the milking operation may be performed in an efficient manner. To achieve this end, it is necessary to first bring the teats of the cow to the desired location and secondly prevent the cow from moving once she is in the proper position. Thus, it is desirable to restrain both lateral and longitudinal movement of the cow.

The difficulty with previous stalls including the type illustrated in the Ferris patents is that they have static dimensions. Consequently, the stalls must be designed to take the largest cow in a herd. A smaller cow such as a heifer, is thus free to move about within the stall. This results in the cow interfering with the milking. This, of course, was the very problem the Ferris Patent No. 2,904,002 sought unsuccessfully to solve.

The present invention eliminates the deficiencies of previous types of stalls and also provides additional advantages. The stall disclosed in this application has adjustable interior dimensions. This permits the stall to be adjusted for each individual cow, and consequently a cow of any size is prevented from interfering with the milking. The stall is thus ideally suited for the modern method of machine milking.

Another advantage of the inventive stall is that it permits the cow to leave through the front end of the stall rather than exiting through one side of the stall. This means of exiting permits a cow to leave the stall more easily and also more quickly. As a result, the stall becomes quickly available for use in milking another cow.

The detailed structure and operation of two forms of the invention and the foregoing and other objects will be more apparent when viewed in the light of the accompanying drawings, wherein:

FIG. 7 is a top plan view illustrating a modified embodiment of the invented stall;

FIG. 8 is a partial side elevation view of the modified embodiment of FIG. 7; and, FIG. 9 is a partial elevation section taken along the line 9—9 of FIG. 7.

Figure 1:
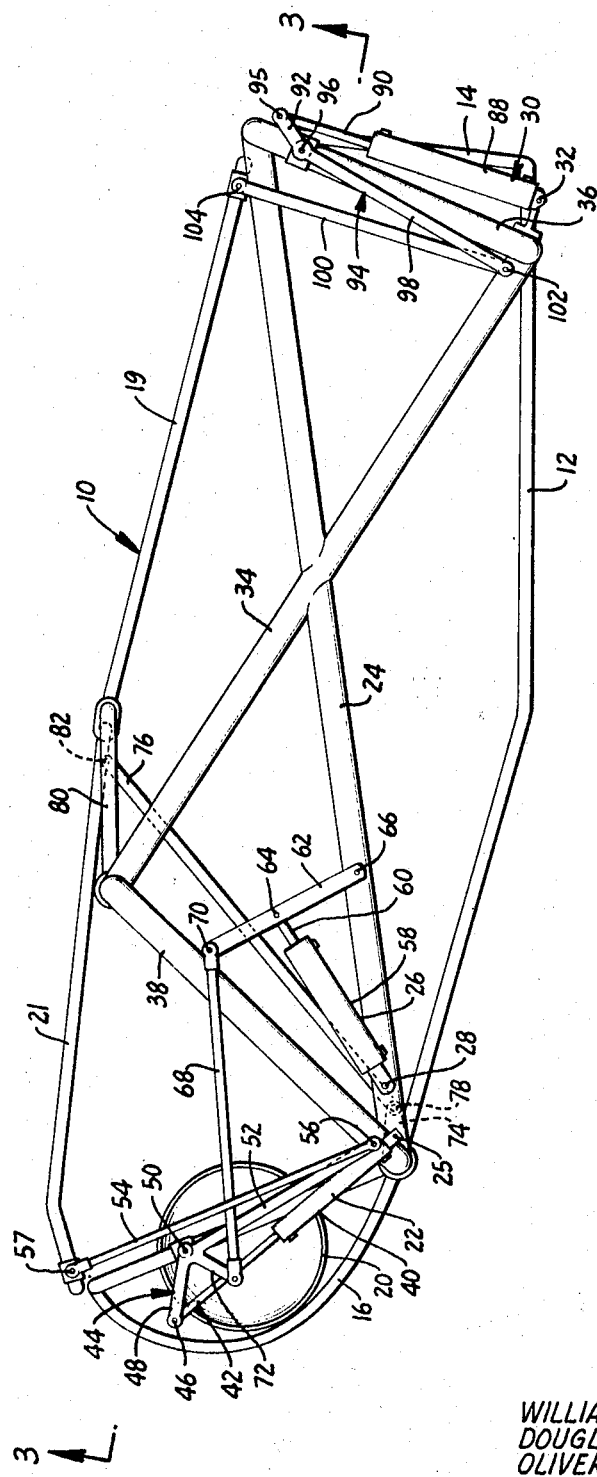
FIG. 1 is a top plan view illustrating a preferred embodiment of the inventive stall.
Figure 2:
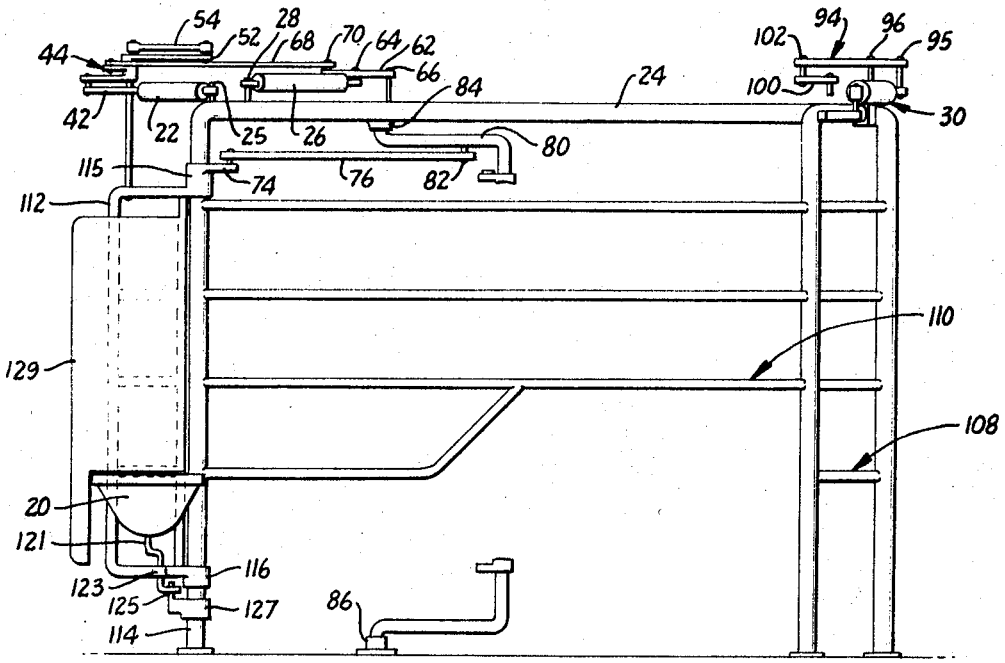
FIG. 2 is a side elevation view of the side wall of a preferred embodiment of the inventive stall.
Figure 3:
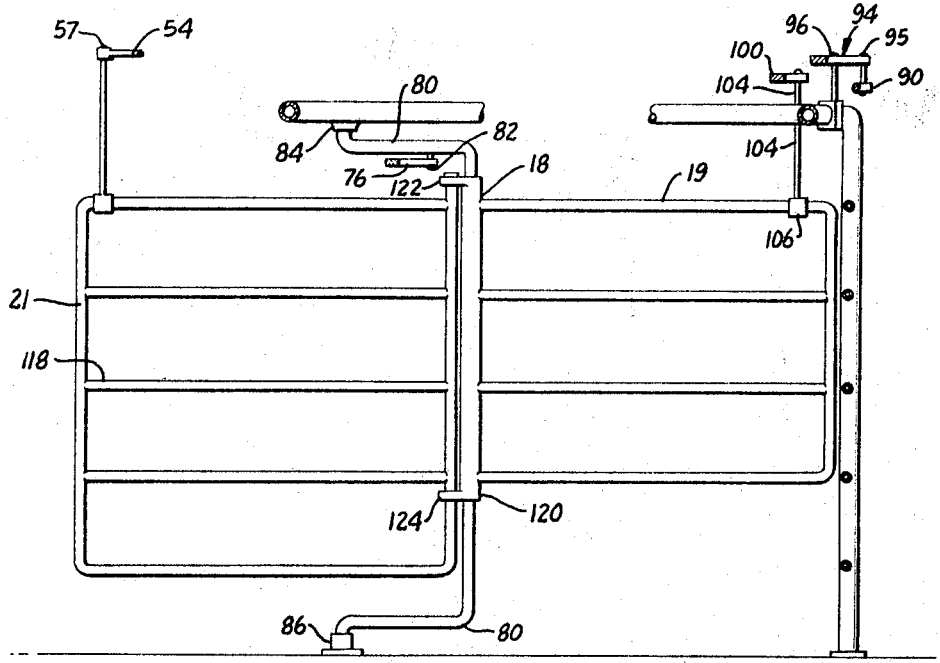
FIG. 3 is a section view taken along line 3—3 of FIG. 1.

Referring now in detail to FIGS. 1, 2 and 3, the preferred embodiment of the stall is designated in its entirety by numeral 10. The stall comprises: a side wall 12 on one side, a rear end wall 14 adjacent to the side wall 12, a front end wall 16 adjacent to the side wall 12 and opposite from the rear end 14, a side wall 18 having an entrance gate 19 and an exit gate 21 completes the enclosure, a retractable feed pail 20 is mounted on the front end 16, a piston and linkage combination, indicated in general by the numeral 22, is mounted on a cross-member 24, at point 25 and serves to initially open and close the front end 16 and the exit gate 21 of the stall 10, a piston and linkage combination, indicated in general by the numeral 26, is mounted on the cross-member 24 at point 28 and serves to adjust the interior dimensions of the stall 10; a piston and linkage combination, indicated in general by the numeral 30 is mounted on side wall 12 at point 32 and serves to open and close the entrance gate 19, a cross-member 34 and end cross-members 36 and 38 in combination with the cross-member 24 form a frame on top of the stall 10.

The piston and linkage combination 22 serves to initially open and close the front end 16 and the exit gate 21 and comprises: a piston 40 which operates a plunger 42; the plunger 42 is connected to a three leg member 44 by a pin 46 at leg 48; the three leg member 44 is connected to the front end 16 by a pin 50, and a leg 52 of the three leg member 44 is connected to link 54 by pin 56. The outer end of link 54 is connected by a pin 57 to the exit gate 21 so that when plunger 42 is pulled into cylinder 40, the three leg member 44 rotates counter-clockwise as viewed in FIG. 1 opening the exit gate 21 clockwise and opening the front wall 16 counter-clockwise as illustrated in greater detail in FIG. 6.

The piston and linkage combination 26 serves to adjust the interior dimensions of the stall 10 and comprises: a piston 58 which operates a plunger 60 which is connected to link 62 by pin 64. The link 62 is pivotally connected to the cross-member 24 by pin 66 and also connected to the link 68 by pin 70. The link 68 is connected to a leg 72 of the three leg member 44. The three leg member 44 is connected to the front end 16 by pin 50. The front end 16 is rigidly connected to an arm 74 (seen best in FIG. 2) which is in turn connected to a link 76 by pin 78. Link 76 is connected to center frame 80 by pin 82. Center frame 80 is pivotally mounted in the sockets 84 and 86 (see FIG. 3) in the member 38 and floor respectively, and the entrance gate 19 and exit gate 21 are hinged on the center frame 80.

The piston and linkage combination 30 serves to open and close the entrance gate 19. A piston 88 operates a plunger 90 which is connected to a leg 92 of a two leg member 94 by pin 95. The two leg member 94 is rotatably mounted by the pin 96 to the cross-member 36. A leg 98 of the two leg member 94 is connected to link 100 by pin 102. Link 100 is connected to the entrance gate 19 by the pin 104 and bracket 106 (see FIG. 3).

The rear end 14 is composed of a tubular frame 108 and located at a right angle to the side wall 12.

The side wall 12 is also composed of a tubular frame 110.

The front end 16 is similarly composed of a curved tubular frame 112 and is rotatable around a post 114 on a hub 115 and a sprocket 116.

The side wall 18 as shown in FIG. 3 is composed of a tubular frame 118 with the entrance, gate 19, rotatable about the center frame 80 by a tubular member 120, the tubular member 120 has flanges 122 and 124 which rotatably hold the exit gate 21. While the entrance gate 19 and the exit gate 21 have been shown to be mounted on separate axes, it would, of course, be possible to mount them on the same axis. The term adjacent axes is used to describe both types of arrangements.

As indicated above, the feed manger 20 is mounted on the inner side of the front gate 16. The manger is preferably movably mounted for automatic retraction when the front gate opens so that any feed left in the manger will be withdrawn from the cow and will not tempt the cow to remain in the stall. Thus, as illustrated in FIG. 2, the manger 20 is mounted on an arm 121 which is pivotally mounted on the bottom tube of the front gate 112 by a bearing 123. A spring, not shown, urges the manger through the front gate 16 to a position outside of the stall. A pin 125 is rigidly held in a bracket 127 attached to post 114 and positioned to strike the arm 121 and rotate manger 20 through the front gate 17 into the stall as the front gate closes. Additionally, a sheet metal shroud 129 is mounted on the front gate to prevent an animal in the stall from seeing through the front gate during milking and to prevent the animal from seeing the manger 20 after the front gate 16 opens and its biasing spring withdraws the manger 20 therethrough.

Figure 4:
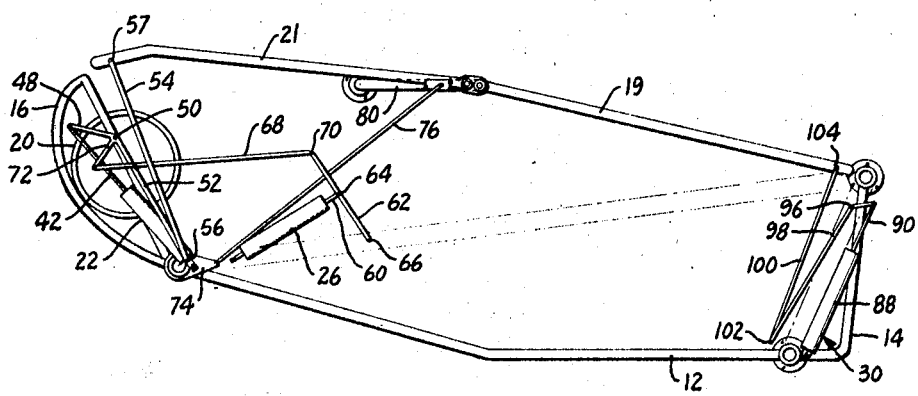
FIG. 4 is a top plan view illustrating a preferred embodiment of the inventive stall in an initially closed position.
Figure 5:
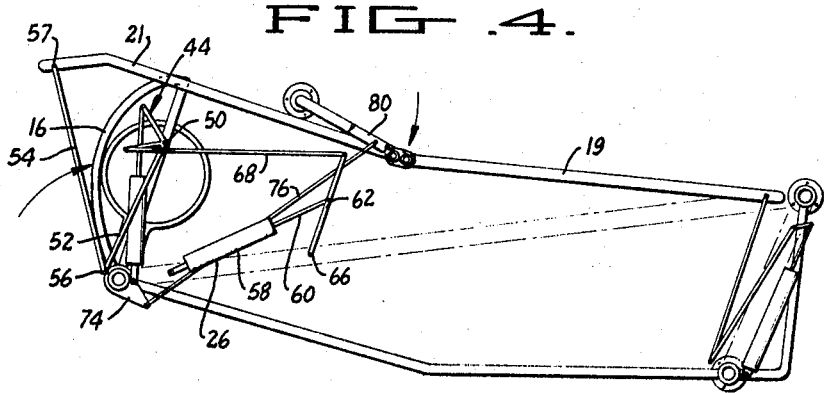
FIG. 5 is a top plan view illustrating how the interior dimensions of a preferred embodiment of the inventive stall may be adjusted.
Figure 6:
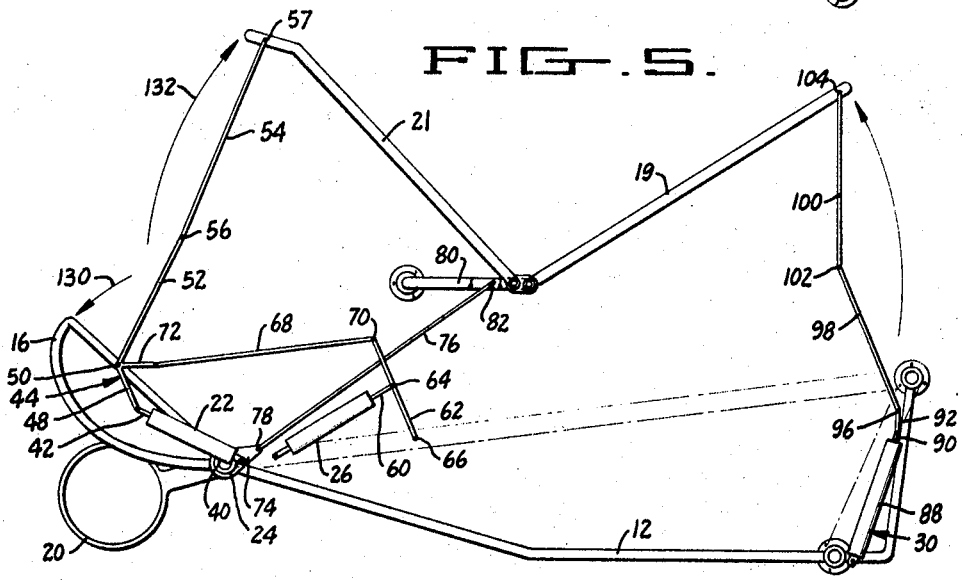
FIG. 6 is a top plan view illustrating a preferred embodiment of the inventive stall in an open position.

FIGS. 4, 5 and 6 illustrate how the stall 10 operates. FIG. 4 illustrates an initially closed position. FIG. 5 illustrates how the piston linkage combination 26 operates to adjust the interior dimensions of the stall 10. When the piston 58 pushes the plunger 60 outward the link 62 is pivoted clockwise. Link 62 in turn pulls the link 68 to the right. Link 68 pulls on the three leg member 44 which, since it is connected to the front end 16 by the pin 50, pulls the front end 16 inwardly and thereby shortens the effective length of the stall. As the front end 16' rotates inwardly it rotates the arm 74 clockwise which causes the link 76 to be pulled downward. The downward movement of the link 76 causes the center post 80 to be rotated inwardly narrowing the stall at its mid-point. Thus, piston linkage 26 both shortens and narrows the interior dimensions of the stall 10. To increase the size of the stall 10, the plunger 60 is withdrawn into the piston 58. Of course, the shortening operation and narrowing operation may be performed independently of each other by two different mechanisms, but we prefer to employ a single mechanism for performing the two operations simultaneously because a smaller cow is generally both shorter and narrower than a large cow.

Where our preferred mechanism is employed for opening the front of the stall, it will be noted that the particular linkage employed involves a subtle mode of operation. Thus, when the stall is initially shortened from the position shown in FIG. 4 to the position of FIG. 5, the pivot point 50 moves across the line of centers of pivots 56 and 57. As a result, it is impossible to open the front gates 16 and 21 until the stall is returned to its lengthened condition. When the stall is to be opened, the cylinders 22 and 26 can be connected to the same source of power, and the cylinder 26 will contract to about its minimum length before the cylinder 22 starts to contract at all.

FIG. 6 illustrates how the piston linkage combination 22 operates to open the front end 16 and the exit gate 21 when the stall is fully expanded by cylinder 26. When the piston 40 withdraws the plunger 42 the leg 48 is pulled in a counter-clockwise direction pivoting about the point of intersection of leg 72 and link 68. Since leg 48 is part of the three leg member 44 which is attached to pin 50, the pin 50 acts to pull the front end 16 in a counter-clockwise direction, thus opening the front end 16 as indicated by arrow 130. The counter-clockwise rotation of the three leg member 44 pushes leg 52 in a counter-clockwise direction which pushes link 54 outward against the entrance gate 21. Thus, the entrance gate 21 is also pushed open as indicated by arrow 132. At this time the pin 125 (FIG. 2) releases arm 121 permitting the manger 20 to be retracted by its mounting spring. Thus, a cow may pass directly out through the front of the stall 10. When the piston 40 pushes the plunger 42 outward, the reverse of the above reaction occurs, thus closing the exit gate 21 and the front gate 16 and moving the manger 20 back into the stall.

FIG. 6 also illustrates how the piston linkage combination 30 operates to open and close the entrance gate 19. When the piston 88 withdraws the plunger 90, the leg 92 is pulled clockwise pivoting about pin 96, thus causing the leg 98 to rotate clockwise and outwardly. The leg 98 thus forces the link 100 outward against the entrance gate 19 causing the entrance gate 19 to open. When the piston 88 pushes the plunger 90 outward the reverse of the above reaction occurs, thus closing the entrance gate 19. The amount the entrance gate 19 closes is, of course, a function of the amount the plunger 90 is withdrawn. In this embodiment the rear end 14 is dimensioned to handle the smallest cow, thus by regulating the amount the plunger 90 is withdrawn. The hindquarters of any size cow may be held securely against the wall 12 of the stall.

Means for activating the pistons 40, 58 and 88 have not been shown. Any appropriate means such as a pneumatic system would be suitable. Similarly, other means for activating the linkages besides pistons, would also be appropriate.

It has been ascertained that a cow will voluntarily adjust her position according to the location of a feeding manger. The cow can be induced to crowd the rear of a stall merely by moving the manger closer to the rear of the stall. The following modification has been devised to advantageously employ this principle. FIG. 7 illustrates the plan view of the modified stall which is in many respects identical to the stall illustrated in FIG. 1.

The modified stall 10' comprises a side wall 18 having an entrance gate 19 and exit gate 21 identical to the previously disclosed stall 10, FIG. 1. The rear end wall 14 and apparatus thereto attached is also identical. The side wall 12' has an additional tubular rung 136, illustrated in FIG. 8, and has an overall length slightly greater than in the prior stall 10. The front end wall 16' is stationary, comprising tubular rungs between post 114 and added post 138.

The adjustable manger 20' has a shield or shroud 140 directly attached to the manger 20' for movement therewith. The shroud 140 prevents the cow from seeing through the front end wall 16' and becoming excited by the many operations going on about her. The manger 20' is mounted to the side wall by tubular graces 142 and 144 bent to the configurations illustrated in FIGS. 7, 8 and 9. The braces 142 and 144 are fixed to slide bearings 146 and 148 encircling tubular rungs 136 and 150 which permit the attached manger 20' to slide forward to the front end wall 16' and rearward for a substantial distance toward the rear end wall 14'. This movement may be controlled by a hydraulic cylinder 152 connected at one end to the tubular rung 150 and at its other end to slide bearing 148. The hydraulic cylinders 152 may be remotely controlled by an operator from a console (not shown) in the milking pit.

Since the front end wall 16' is stationary in the modified stall 10', the mechanism for shortening the stall is dispensed with. Piston 58 is now mounted on cross-member 24' at point 28' and is directly connected to center-post 80 at point 82. When piston 58 withdraws its plunger 60, the centerpost rotates inwardly causing the stall to be narrowed at its mid-point in the same manner as the previously described stall 10, FIG. 4.

Piston 40 now functions independently of piston 58 and in a simplified manner. The piston 40 is attached to cross-member 24' at point 25 and to leg 48' of the now two leg member 44'. The pivot pin 50 is fixed to cross-member 34' near post 138. When piston 40 withdraws plunger 42, leg 52' pushes link 54' outward against entrance gate 21 opening the gate 21 in the same manner as in the previously described stall.

From the above disclosure, it is apparent that a simplified stall, which, however, would lose many advantages of the preferred embodiments can be devised dispensing with front end wall 16' and exit gate 21. If the manger were so constructed that it could horizontally pivot on pins on the slide bearings, 146 and 148, to a position outside the stall 10', then the cow could pass through the front end opening to leave the stall 10'. For this modification, the shrould 140 must be discarded to enable the manger 20' to swing between the tubular rungs 150 and 136.

The foregoing is considered as illustrative only of the principle of this invention. Numerous modifications will occur to those skilled in the art. Hence, it is not the function of the above description to limit the invention to the exact construction and method of operation shown and described.

We claim:

1. A cow milking stall comprising:
 (A) a first side wall adapted to be mounted adjacent to a milking station;
 (B) a second side wall spaced from the first side wall generally parallel thereto;
 (C) a rear wall extending between the side walls and having at least one end of the rear wall stationary;
 (D) a front wall spaced from the rear wall and extending between the side walls;
 (E) entrance gate means forming at least a portion of one of said walls for admitting cows to the elongated space with the head of the cow adjacent to the front wall and the tail of the cow adjacent to the rear wall;
 (F) stall adjusting means including a pivotal connection for moving the front wall toward and away from the rear wall; and
 (G) first and second side walls together with the front and rear walls enclosing an elongated space for holding a cow.

2. The stall of claim 1 in which the adjusting means comprises:
 (A) means for swinging the front wall away from the rear wall and the second side wall to an open position to provide an exit opening from the elongated area and swinging the front wall toward the rear wall and the second side wall to a closed position closing the exit opening; and
 (B) means for swinging the front wall from the closed position toward the rear wall.

3. The stall of claim 1 in which said adjusting means includes:
 (A) shortening means for moving said front wall toward said rear wall to shorten said elongated space; and
 (B) narrowing means for moving at least a portion of said second wall toward the first side wall to narrow the elongated space.

4. The stall of claim 1 in which said adjusting means comprises means for simultaneously moving said front wall toward said rear wall and moving at least a portion of said second side wall toward said first side wall to simultaneously shorten and narrow said elongated space.

5. The stall of claim 2 characterized further by the inclusion of
 (A) a manger mounted on said front wall; and
 (B) movable support means for moving said manger through said front wall into said elongated space when said front wall swings from said open position to said closed position and for moving said manger through said front wall out of said elongated space when said front wall swings from said closed position to said open position.

6. The stall of claim 3 in which said second side wall comprises:
 (A) a generally vertical post laterally spaced from and positioned about midway of the length of said first side wall;
 (B) a gate panel forming a portion of said entrance pivotally mounted on said post and extending from said post to said rear wall; and
 (C) a second gate panel pivotally mounted on said post and extending from said post to said front wall; and in which said narrowing means comprises means for swinging said post toward said first side wall about a vertical axis positioned between said post and said front wall.

7. A cow stall comprising:
 (A) a rigid long wall forming a first stall side;
 (B) a rigid short wall mounted at one end of said long wall and forming a stall rear wall with said short wall mounted in fixed position and extending generally perpendicular to said long wall;
 (C) a front wall attached to said long wall at the end thereof opposite to said rear wall and extending laterally from said long wall on the same side of said long wall as said short wall;
 (D) support means defining a vertical pivot axis which is located between said front and rear walls and laterally spaced from said long wall on the same side thereof as said front and rear walls;
 (E) a generally vertical post pivotally mounted on said support means for pivotal movement around said pivot axis with said post positioned between said pivot axis and said rear wall;
 (F) a stall entrance gate pivotally mounted on said post and extending between said post and said rear wall;
 (G) a stall exit gate pivotally mounted on said post and extending between said post and said front wall; and
 (H) stall narrowing means for swinging said post around said pivot axis in a direction toward said long wall.

8. The stall of claim 7 in which a second vertical post is mounted on said long wall on the end thereof remote from said short wall, and said front wall is pivotally mounted on said second post.

9. The stall of claim 8 characterized further by the inclusion of control means for swinging said front wall on said second post between an open position remote from said exit gate and a closed position adjacent to said exit gate.

10. The stall of claim 9 characterized further by the inclusion of second control means interconnecting said stall narrowing means and said front wall for swinging said front wall on said second post from said closed position toward said rear wall as said first post swings around said pivot axis toward said long wall.

11. A cow stall comprising:
 (A) a first side wall adapted to be mounted adjacent to a milking station;
 (B) a second side wall spaced from the first side wall generally parallel thereto;
 (C) a rear wall extending between the side walls and having at least one end of the rear wall stationary;
 (D) entrance gate means forming at least a portion of one of said walls for admitting cows to the elongated space with the tail of the cow adjacent to the rear wall;
 (E) a manger, providing a wall means which is positioned between the side walls removed from said rear wall, having horizontal adjustment means for repositioning the manger at a distance closer to said rear wall and at a distance more removed from said rear wall.

References Cited

UNITED STATES PATENTS

| | | | |
|---|---|---|---|
| 2,198,048 | 4/1940 | Babson et al. | 119—27 |
| 2,528,255 | 10/1950 | Thomas | 119—27 |
| 2,547,426 | 4/1951 | Youngmann | 119—27 |
| 2,617,382 | 11/1952 | Duncan | 119—14.03 |
| 2,688,309 | 9/1954 | Ferris | 119—27 |
| 2,714,367 | 8/1955 | Arnold | 119—27 |
| 2,904,001 | 9/1959 | Ferris | 119—14.03 |
| 3,024,766 | 3/1962 | Eveland | 119—96 |
| 3,095,854 | 7/1963 | Bott et al. | 119—14.04 |
| 3,106,188 | 10/1963 | McMurray | 119—20 |
| 3,223,070 | 12/1965 | Gribble et al. | 119—14.03 |

ALDRICH F. MEDBERY, *Primary Examiner.*

U.S. Cl. X.R.

119—14.03